United States Patent
Jeran et al.

(10) Patent No.: US 10,205,596 B2
(45) Date of Patent: Feb. 12, 2019

(54) AUTHENTICATING A CONSUMABLE PRODUCT BASED ON A REMAINING LIFE VALUE

(71) Applicant: Hewlett-Packard Development Company, L.P., Houston, TX (US)

(72) Inventors: Paul L. Jeran, Boise, ID (US); Shell S. Simpson, Boise, ID (US); Stephen D. Panshin, Corvallis, OR (US); Jefferson P. Ward, Brush Prairie, WA (US)

(73) Assignee: Hewlett-Pachard Development Company, L.P., Houston, TX (US)

( * ) Notice: Subject to any disclaimer, the term of this patent is extended or adjusted under 35 U.S.C. 154(b) by 19 days.

(21) Appl. No.: 14/908,692

(22) PCT Filed: Jul. 31, 2013

(86) PCT No.: PCT/US2013/052932
§ 371 (c)(1),
(2) Date: Jan. 29, 2016

(87) PCT Pub. No.: WO2015/016881
PCT Pub. Date: Feb. 5, 2015

(65) Prior Publication Data
US 2016/0173284 A1 Jun. 16, 2016

(51) Int. Cl.
*H04L 29/00* (2006.01)
*H04L 9/32* (2006.01)
(Continued)

(52) U.S. Cl.
CPC ........ *H04L 9/3247* (2013.01); *B41J 2/17546* (2013.01); *G03G 15/0863* (2013.01);
(Continued)

(58) Field of Classification Search
CPC ... H04L 9/3247; H04L 63/08; G03G 21/1889; G03G 21/1892; G03G 15/0863; G03G 15/5079; B41J 2/17546
See application file for complete search history.

(56) References Cited

U.S. PATENT DOCUMENTS

| 6,672,695 B1 | 1/2004 | Naka et al. |
| 7,221,473 B2 | 5/2007 | Jeran et al. |

(Continued)

FOREIGN PATENT DOCUMENTS

| CN | 1163353 | 8/2004 |
| CN | 102173233 | 9/2011 |

(Continued)

OTHER PUBLICATIONS

Anderson, Ross. "Cryptography and competition policy-issues with 'trusted computing'." Economics of Information Security. Springer US, 2004. 35-52.*

(Continued)

*Primary Examiner* — Don G Zhao
(74) *Attorney, Agent, or Firm* — Fabian VanCott (57) ABSTRACT

Authenticating a consumable product based on a remaining life value includes determining whether an identifier stored in memory of a consumable product is listed in a device history and concluding that the consumable product is not authentic if the device is determined to have used the consumable product previously based on the device history and a current remaining life value associated with the consumable product indicates less use than a recorded remaining life value for the consumable product associated with the identifier in the device history.

18 Claims, 4 Drawing Sheets

300

- Determine whether an identifier stored in memory of a consumable product is listed in a device history of a device — 302
- Conclude that the consumable product is not authentic if the device is determined to have used the consumable product previously based on the device history and a current remaining life value associated with the consumable product indicates less use than a recorded remaining life value for the consumable product associated with the identifier in the device history — 304

(51) Int. Cl.
  *G03G 21/18*  (2006.01)
  *B41J 2/175*  (2006.01)
  *H04L 29/06*  (2006.01)
  *G03G 15/08*  (2006.01)
  *G03G 15/00*  (2006.01)

(52) U.S. Cl.
  CPC ..... *G03G 15/5079* (2013.01); *G03G 21/1892* (2013.01); *H04L 63/08* (2013.01); *G03G 21/1889* (2013.01)

(56) References Cited

U.S. PATENT DOCUMENTS

| | | | |
|---|---|---|---|
| 7,280,772 | B2 | 10/2007 | Adkins et al. |
| 2005/0219600 | A1* | 10/2005 | Lapstun ............... B41J 2/17503 358/1.14 |
| 2006/0051106 | A1 | 3/2006 | Takahashi et al. |
| 2006/0092210 | A1* | 5/2006 | Maniam ................. G07D 7/20 347/19 |
| 2006/0114491 | A1* | 6/2006 | Kim ..................... G03G 15/553 358/1.14 |
| 2006/0140647 | A1 | 6/2006 | Adkins et al. |
| 2006/0279588 | A1* | 12/2006 | Yearworth ............ B41J 29/393 347/6 |
| 2007/0153078 | A1 | 7/2007 | Cowburn |
| 2008/0077802 | A1 | 3/2008 | Richardson et al. |
| 2009/0119066 | A1 | 5/2009 | Strong et al. |
| 2009/0319802 | A1* | 12/2009 | Walmsley ............ B41J 2/17546 713/189 |
| 2010/0172659 | A1* | 7/2010 | Jeon ..................... G03G 15/553 399/12 |
| 2011/0208966 | A1 | 8/2011 | Silverbrook |
| 2011/0211849 | A1 | 9/2011 | Okamoto |
| 2012/0134687 | A1* | 5/2012 | Jones ................. G03G 15/0863 399/12 |
| 2013/0028617 | A1* | 1/2013 | Fukuoka .............. G03G 15/502 399/27 |
| 2013/0070279 | A1* | 3/2013 | Misumi .............. G06K 15/4095 358/1.14 |
| 2013/0073859 | A1* | 3/2013 | Carlson ................. H04L 9/3247 713/176 |
| 2013/0083096 | A1 | 4/2013 | Rice et al. |
| 2013/0175293 | A1* | 7/2013 | Burgess ................ D06F 39/022 222/23 |
| 2013/0183048 | A1 | 7/2013 | Eom |
| 2014/0003836 | A1* | 1/2014 | Burchette .......... G03G 21/1889 399/109 |

FOREIGN PATENT DOCUMENTS

| | | |
|---|---|---|
| EP | 1004450 | 5/2000 |
| KR | 1020090076546 | 7/2009 |
| TW | 200731142 A | 8/2007 |

OTHER PUBLICATIONS

Sturgill, Margaret, et al. "Security printing deterrents: a comparison of thermal ink jet, dry electrophotographic, and liquid electrophotographic printing." Journal of Imaging Science and Technology 52.5 (2008): 50201-1.*

Jun, Benjamin. "Attack of the clones: Building clone-resistant products."Presentation in Proceedings of RSA Conf. 2006.*

Mattimore, et al. "A General Purpose Driver Board for the HP26 Ink-Jet Cartridge With Applications to Bioprinting", IEEE; Mar. 18-21, 2010, pp. 510-513.

PCT International Search Report and Written Opinion, dated Apr. 29, 2014, PCT Application No. PCT/US2013/052932, Korean Intellectual Property Office, 14 pages.

European Patent Office, extended European Search Report for Appl. No. 13890396.8 dated Feb. 10, 2017 (8 pages).

* cited by examiner

AUTHENTICATING A CONSUMABLE PRODUCT BASED ON A REMAINING LIFE VALUE

CROSS-REFERENCE TO RELATED APPLICATION

This application is a U.S. National Stage Application of and claims priority to International Patent Application No. PCT/US2013/052932, filed on Jul. 31, 2013, and entitled "AUTHENTICATING A CONSUMABLE PRODUCT BASED ON A REMAINING LIFE VALUE," which is hereby incorporated by reference in its entirety.

BACKGROUND

Authentication is a process of proving or verifying that certain information is genuine. Authentication processes can use different mechanisms to ensure that the information is genuine. For example, a user identification code and a password may be used to verify that an author is who the author says he is when logging into a website to publish an online article.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

The principles described herein include a method for authenticating a consumable product, such as a print cartridge, based on a remaining life value. Such an example includes determining whether an identifier stored in memory of a consumable product is listed in a device history of a device and concluding that the consumable product is not authentic if the device is determined to have used the consumable product previously based on the device history and a current remaining life value associated with the consumable product indicates less use than a recorded remaining life value for the consumable product associated with the identifier in the device history.

Print cartridges can be authenticated upon installation into the printer so that for example a warranty eligibility of the print cartridge can be determined. For example third party printer cartridges may not fall under warranties offered by the original printer company.

The remaining life value measures the remaining life that the consumable product has. The remaining life value may be based on the overall condition of the consumable product and not just on the level of useable fluids or other materials contained therein. A high remaining life value may indicate that the consumable product has a lot of remaining life before the consumable product is expected to break or before the consumable product is expected to be retired. On the other hand, a low remaining life value may indicate that the consumable product has a shorter useful remaining life.

In the following description, for purposes of explanation, numerous specific details are set forth in order to provide a thorough understanding of the present systems and methods. It will be apparent, however, that the present apparatus, systems, and methods may be practiced without these specific details.

Figure 1A:
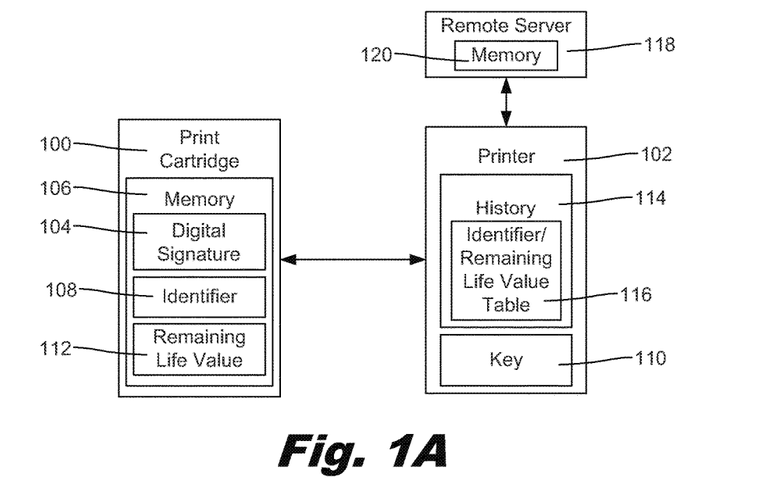
FIG. 1A is a diagram of an example of a consumable product and a device according to the principles described herein.

FIG. 1 is a diagram of an example of a consumable product and a device according to the principles described herein. In this example, the consumable product is a print cartridge (100) and the device is a printer (102). The print cartridge (100) may provide any appropriate supply to the printer including ink, dry toner, wet toner, liquids, other materials, or combinations thereof. While this example is described with reference to the consumable product being a print cartridge, any appropriate consumable product may be used. For example, the consumable product may be an oil filter, an air filter, another type of filter, a print cartridge, a pharmaceutical fluid cartridge, a fluid reservoir for titration, an erosion prone component of a machine, a battery, another type of component, or combinations thereof. Further, while this example is described with reference to specific types of devices, any appropriate type of device may be used in accordance with the principles described herein. For example, the device (102) may be a two dimensional printer, a three dimensional printer, an automobile, a vehicle, a plane, a boat, construction equipment, a machine, a computer, another type of device, or combinations thereof.

In the example of FIG. 1, the print cartridge (100) contains a digital signature (104) that is contained in memory (106); this digital signature attests to the authenticity of data that is also contained in memory (106). In one implementation, (a portion of) the data may be recoverable from the signature itself; in another implementation, the data and the signature are separate. The data contains an identifier (108) that is unique to the printer cartridge (100).

In response to being inserted into the appropriate receptacle in the printer (102), the printer (102) and the print cartridge (100) are positioned such to communicate with one another. For example, the printer's receptacle may include electrical contacts that are positioned to abut electrical contacts of the print cartridge (100), which completes an electrically conductive pathway on which the printer (102) and the print cartridge (100) can exchange data. In other examples, the receptacle is positioned such that the print cartridge (100) can wirelessly communicate with the printer (102). In response to being able to communicate, an authentication session between the printer (102) and the print cartridge (100) is initiated where printer (102) executes an authentication protocol to verify the signed data, the identifier, the hardware, other components or code of the printer cartridge (100), or combinations thereof. The print cartridge (100) may request authentication to initiate the authentication session. However, in other examples, the printer (102) initiates the authentication session.

The printer may use a key (110), a private key, a symmetric key, another mechanism, or combinations thereof to verify the digital signature and to recover any data embedded in the digital signature (104). If the digital signature and signed data (104) do not appear to be genuine, the printer (102) will deny authentication. However, if the digital signature and signed data (104) appear to be genuine, the printer (102) will use an additional layer of scrutiny to ensure that the digital signature and signed data were not copied.

The additional layer of scrutiny may include a remaining life value (112). The printer (102) may ascertain the remaining life value (112) of the print cartridge (100). The remaining life value (112) may include a value that reflects a single factor or multiple factors that collectively predict the remaining life that the print cartridge has before the print cartridge breaks or is otherwise intended to be retired. For example, the remaining life value may have a drum life factor, a developer life factor, a life factor for another component of the print cartridge (100), or combinations thereof. In some examples, the level of the supply in the print cartridge (100) is also considered in the remaining life value. For example, if the print cartridge (100) does not contain the ability to be refilled, the supply level may be one of multiple factors that makes up the remaining life value (112). In examples where the print cartridge (100) does have an ability to be refilled, the weight given to the supply level in determining the remaining life value may be less because the supply level corresponds less to the overall remaining life for the print cartridge (100). In some examples, the print cartridge (100) may have a specific number of times that the supply can be replenished. In such examples, the print cartridge (100) can track the refills, and the number of refills may be a factor that contributes to the remaining life value (112).

The remaining life value (112) may be determined internally by the print cartridge (100), the printer (102), a web service, another device, or combinations thereof. The values associated with each of the factors may be determined based on the print cartridge's performance, hours of operations, overall age, hours of inactivity, weight, other mechanisms, or combinations thereof. While this example has been described with specific reference to factors that contribute to and/or mechanisms to determine the remaining life value (112), any appropriate factors or mechanisms may be used in accordance with the principles described herein.

The printer (102) may keep a history (114) that includes a record of the previous print cartridges that the printer (102) has used. The history (114) may include a table (116) that associates the identifier of the previously used print cartridges with their respective remaining life values. For example, the table may associate an identifier of a previously used print cartridge with the remaining life value of that print cartridge at the time that the previously used print cartridge was removed from the printer (102). In other examples, the table (116) associates the remaining life value that reflects the time that the previously used print cartridge was installed into the printer (102). In yet other examples, the remaining life value is periodically measured, or measured on demand, while the printer (102) is using the print cartridge, and the table (116) records each measurement or the table (116) is updated.

In response to determining that the print cartridge (100) appears to be genuine based on the digital signature (104), the printer (102) determines whether the identifier (108) in the signed data (104) matches one of the identifiers in the printer's history (114). If the printer (102) has used a particular print cartridge previously, that print cartridge's unique identifier will be listed in the history (114). For example, if the print cartridge (100) is removed from the printer (102) to refill the print cartridge (100), the print cartridge (100) may be re-installed into the printer (102) and the authentication process may be repeated. In other examples, the print cartridge (100) may be removed from the printer (102) while the printer undergoes maintenance. Conceivably, the print cartridge (100) may be realistically installed on one or multiple printers multiple times and for multiple different reasons.

In an example, the printer (102) operates on an assumption that the print cartridge's remaining life value (112) will decrease over time, for example based on a warranty policy. Thus, the printer's assumption includes that there is no legitimate reason for the print cartridge's remaining life value to increase on a subsequent use. As a result, if there is a match between the identifier contained in the print cartridge that is currently undergoing the authentication process and a recorded identifier in the printer's history (114), the printer (102) may compare the recorded remaining life value with the current remaining life value (112) of the print cartridge seeking authentication. If the current remaining life value is higher than the recorded remaining life value (or otherwise indicates less use), the printer (102) may conclude that the current print cartridge seeking authentication is not authentic and deny that print cartridge authentication.

These principles provide an additional layer of scrutiny in the authentication process to ensure that the digital signature and signed data (104) in the print cartridge's memory (106) are not copied from a genuine print cartridge. As a result, more non-authenticated print cartridges can be identified.

Further, these principles allow for authentication to occur at the printer (102), which saves time, resources, and is less prone to failure. However, in some examples, the printer's cartridge usage history may be stored on a distant location, such as on a distant device that is connected to the printer over a network connection, for example depending on the memory available locally at the printer. For example, the printer's history may be stored on distant memory, on a server, or combinations thereof. Also, in some examples, the printer's history may be joined with the histories of other printers at a remote location.

In examples where the history is stored at the remote location, the histories from multiple histories can be stored together. In such an example, the combined histories can be studied and ranked according to desired criteria. For example, the printer histories can be sorted by print cartridge identifier. Further, the printer cartridge identifiers used by other printers can be distributed locally to the printers for use during authentication.

For example, if a print cartridge is currently seeking authentication from Printer A, Printer A may check to see if the print cartridge's identifier matches the identifiers of print cartridges used by any other printer. For this example, assume that Printer B reports having used a print cartridge with an identifier that matches the identifier of the print cartridge that is seeking authentication from Printer A. Printer A can check Printer B's history to determine the remaining life value of the print cartridge when the print cartridge was used by Printer B. If the remaining life value of the print cartridge was lower when it was reportedly used by Printer B, than Printer A can conclude that the print cartridge is not authentic and deny authentication. Thus, to determine authenticity, Printer A may rely on not just its history, but the history of other printers as well.

In the example wherein a print cartridge history is stored in the printer, internet connectivity does not have to be established at the time that the print cartridge is installed. Thus, the printer can use the print cartridge with confidence of its authenticity immediately without having to wait to begin the authentication process. In other examples where the printer will not allow for use of a print cartridge until authentication is completed, authentication performed locally at the printer allows the print cartridge to be used shortly after installation when there is no internet connectivity because the authentication process does not rely on the internet connection at the time of installation.

In some examples, additional layers of protection may be used to authenticate the consumable product. For example, the digital properties and/or the analog properties of the consumable product's hardware may be verified through challenges. The comparison of the remaining life values may be one of multiple layers of protection to authenticate the consumable product. While this example has been described with reference to specific layers of protection to prevent against the use of a non-authentic consumable product, any appropriate number of layers of protection may be implemented in accordance with the principles described herein. Any appropriate layer of protection may be implemented in any appropriate order. Further, additional types of layers not described in this specification may also be implemented as other layers of protection, which may be inserted into the authentication order in any appropriate manner.

In some examples, the printer (102) is in communication with a remote device, such as a remote server (118). The remote device may have memory (120) that stores at least a portion of the printer's history, the key, a remaining life calculator, an authentication engine, or combinations thereof. In some examples, the computer readable instructions and hardware for authenticating the print cartridge (100) are distributed across the printer (102), the remote device, another device connected to the remote device or printer (102), or combinations thereof.

Figure 1B:
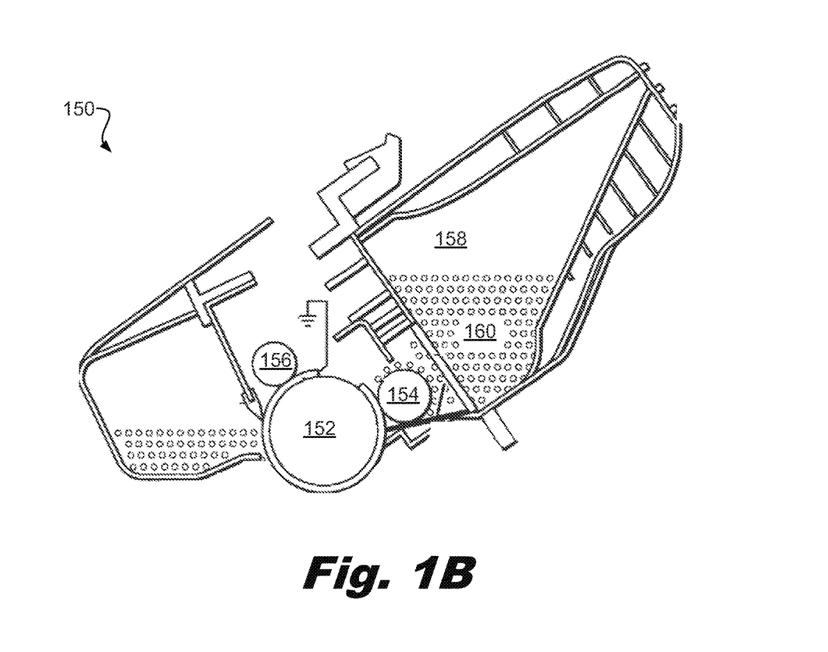
FIG. 1B is a diagram of an example of a consumable product according to the principles described herein.

FIG. 1B is a diagram of an example of a consumable product (150) according to the principles described herein. In this example, the consumable product (150) is a toner cartridge to be inserted into a printer. The toner cartridge has a photoconductor drum (152), a developer roller (154), a primary charge roller (156), a consumable container (158) that contains a consumable (160), such as toner, and other components. Each of the components of the consumable product (150) may affect the overall remaining life value of the consumable product. For example, the wear on the photoconductor drum (152) or the developer roller (154) may be a factor that affects the overall remaining life value of the consumable product. However, the life of the bearings in the product, the remaining life of the product's moving parts, the integrity of the material for each of the parts of the product, and other factors may also affect the overall remaining life value of the consumable product.

Figure 2:
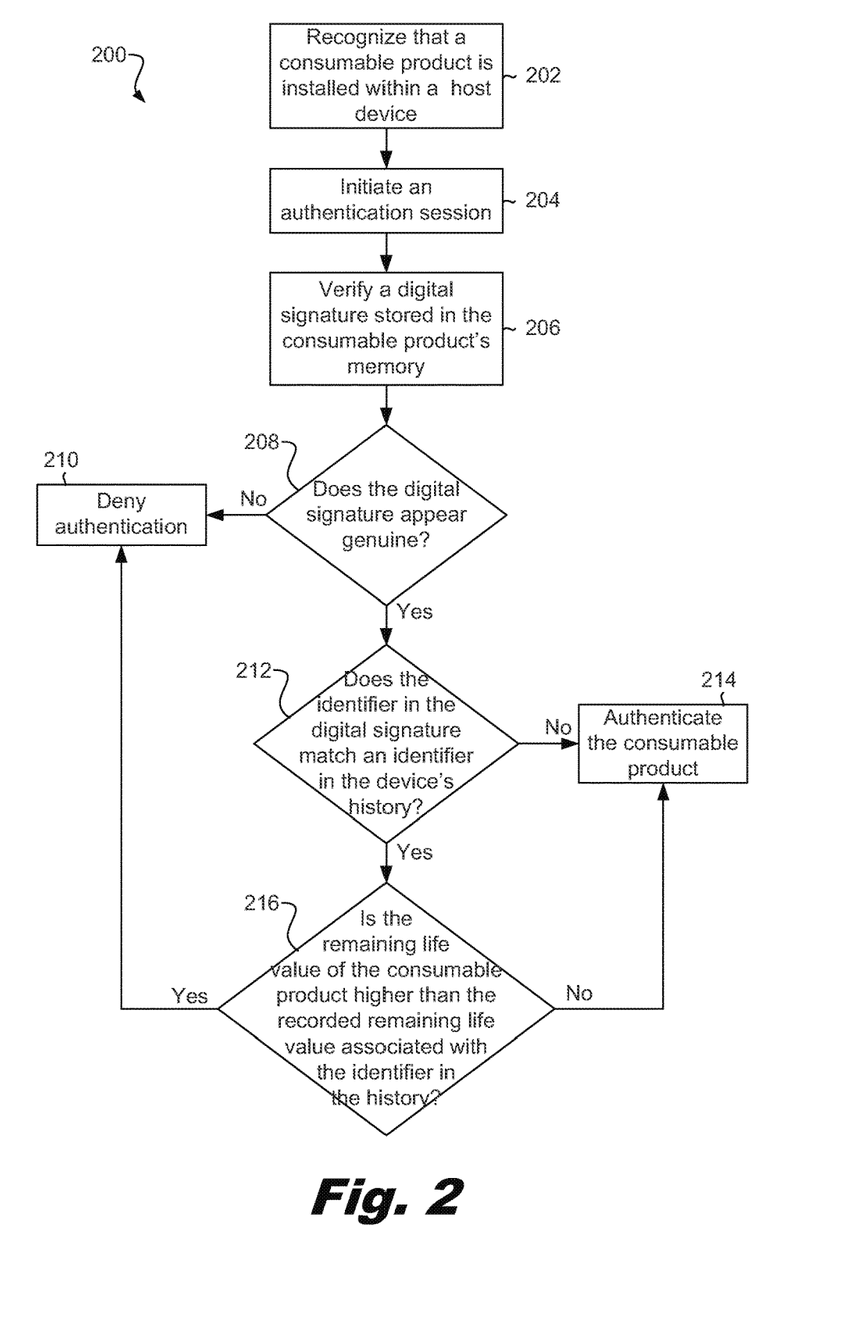
FIG. 2 is a flowchart of an example of a process of a method for authenticating a consumable product based on a remaining life value according to the principles described herein.

FIG. 2 is a flowchart (200) of an example of a process of a method for authenticating a consumable product based on a remaining life value according to the principles described herein. In this example, the process includes recognizing (202) that a consumable product is secured within a host device, initiating (204) an authentication session with the consumable product, and verifying a digital signature stored in the consumable product's memory.

The process also includes determining (208) whether the signed data appears genuine. If the signed data does not appear genuine, authentication is denied (210). On the other hand, if the signed data appears genuine, the process continues with determining (212) whether the identifier in the signed data matches an identifier in the device's history. If the identifier in the signed data fails to match any of the identifiers recorded in the device's history, the consumable product is authenticated (214).

However, if the identifier in the signed data matches one of the identifiers recorded in the device's history, the process continues by determining whether the remaining life value of the consumable product is higher than the recorded remaining life value associated with the identifier in the history. If the remaining life value of the consumable product seeking to be authenticated is higher than the recorded remaining life value associated with the matching identifier, authentication is denied (210). On the other hand, if the remaining life value of the consumable product seeking to be authenticated is equal to or lower than the recorded remaining life value associated with the matching identifier, the consumable product is authenticated (214).

Figure 3:
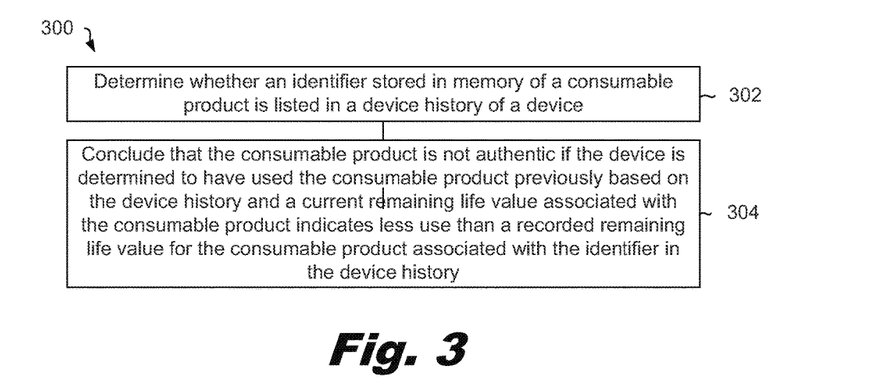
FIG. 3 is a diagram of an example of a method for authenticating a consumable product based on a remaining life value according to the principles described herein.

FIG. 3 is a diagram of an example of a method (300) for authenticating a consumable product based on a remaining life value according to the principles described herein. In this example, the method (300) includes determining whether an identifier stored in memory of a consumable product is listed in a device history of a device and concluding that the consumable product is not authentic if the device is determined to have used the consumable product previously based on the device history and a current remaining life value associated with the consumable product indicates less use than a recorded remaining life value for the consumable product associated with the identifier in the device history (for example, see FIG. 2).

The method may include recognizing that the consumable product is secured to the device or otherwise in communication with the device. In some examples, the identifier is included in signed data that is stored in the memory of the consumable product. The device may use a public key, a secret key, a symmetric key, or another mechanism to verify the digital signature. In other examples, the identifier is stored in a location that is independent of a digital signature. In some examples a key identifier, another type of key, or another type of identifier is stored in the printer's memory, but outside of the digital signature and is used to authenticate the print cartridge.

The device's history may be stored locally in the device. In other examples, the device has access to its history over a network connection. In other examples, the history may be distributed across multiple network components. In yet other examples, the device can access the histories of other printers that are stored either locally on the printer or at a remote location.

The remaining life value may incorporate any appropriate factors that influence the overall life of the consumable product. For example, the remaining life value may include a drum life factor, a developer life factor, number of pages printed factor, number of communications sessions factor, another type of factor, or combinations thereof.

Figure 4:
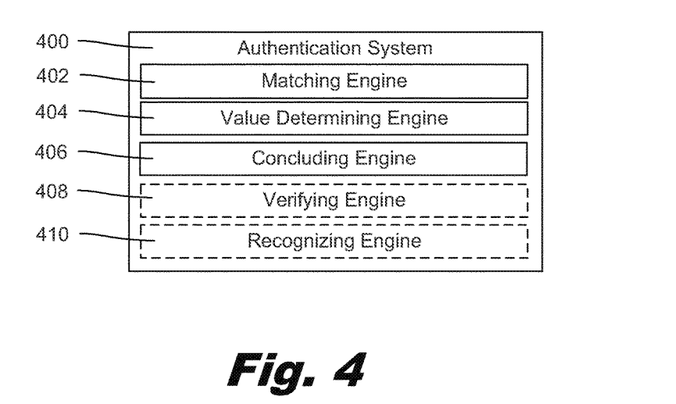
FIG. 4 is a diagram of an example of an authentication system according to the principles described herein.

FIG. 4 is a diagram of an example of an authentication system (400) according to the principles described herein. The authentication system (400) can be a component of any appropriate device. For example, the authentication system (400) may be incorporated into a printer, distant device, a service, a network device, a computing device, smart phone, a tablet, a personal computer, a desktop, a laptop, a watch, a digital device, or combinations. The authentication system (400) includes a matching engine (402), a value determining engine (404), and a concluding engine (406). In the example of FIG. 4, the authentication system (400) includes a verification engine (408) and a recognizing engine (410). The engines (402, 404, 406, 408, 410) refer to a combination of hardware and program instructions to perform a designated function. Each of the engines (402, 404, 406, 408, 410) may include a processor and memory. The program instructions are stored in the memory and cause the processor to execute the designated function of the engine.

The recognizing engine (410) recognizes that a consumable product is requesting authentication from a device. The verification engine (408) verifies a digital signature stored in the consumable product's memory to determine a unique identifier associated with the consumable product. The matching engine (402) determines whether the unique identifier of the consumable product matches a recorded identifier in the device's history. The value determining engine (404) determines the remaining life value of the consumable product.

The concluding engine (406) concludes whether the consumable product is genuine or not. The concluding engine (406) may base this conclusion on multiple factors. For example, the concluding engine (406) may conclude that the consumable product is not genuine, and thereby deny authentication, if the consumable product's identifier matches an identifier listed in the printer's history and if the previously used consumable product is recorded as having a lower remaining life value.

While this example has been described as first determining whether a digital signature appears to be genuine, in some examples the consumable product does not include a digital signature. In such examples, the identifier may be stored in the consumable product's memory, be stored with another mechanism other than with a digital signature, or combinations thereof. The authentication process may rely solely on comparing the identifier to the device's history and determining whether the remaining life value of the recorded matching identifier indicates that the consumable product seeking to be authenticated has been used less. In other examples, the authentication process includes other tasks performed during the authentication process from which comparing the identifiers and remaining life values is one of the authentication tasks.

Figure 5:
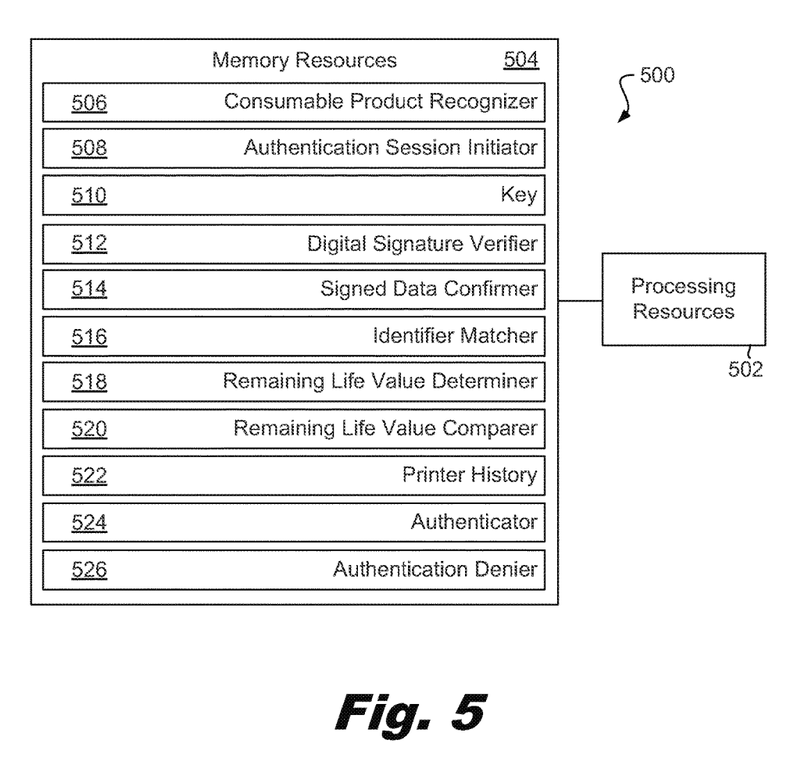
FIG. 5 is a diagram of an example of an authentication system according to the principles described herein.

FIG. 5 is a diagram of an example of an authentication system (500) according to the principles described herein. The authentication system (500) can be a component of any appropriate device. For example, the authentication system (500) may be incorporated into a printer, distant device, a service, a network device, a computing device, smart phone, a tablet, a personal computer, a desktop, a laptop, a watch, a digital device, or combinations. In this example, the authentication system (500) includes processing resources (502) that are in communication with memory resources (504). Processing resources (502) include at least one processor and other resources used to process programmed instructions. The memory resources (504) represent generally any memory capable of storing data such as programmed instructions or data structures used by the authentication system (500). The programmed instructions shown stored in the memory resources (504) include a consumable product recognizer (506), an authentication session initiator (508), a digital signature verifier (512), a signed data confirmer (514), an identifier matcher (516), a remaining life value determiner (518), a remaining life value comparer (520), an authenticator (524), and an authentication denier (526). The data structures shown stored in the memory resources (504) include a key (510) and a printer history (522).

The memory resources (504) include a computer readable storage medium that contains computer readable program code to cause tasks to be executed by the processing resources (502). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, magnetic storage media, other types of memory, or combinations thereof.

The consumable product recognizer (506) represents programmed instructions that, when executed, cause the processing resources (502) to recognize that a consumable product is in a condition to be authenticated. For example, the device may recognize that the consumable product is in a condition to be authenticated if the consumable product is communicating with the device, the consumable product has sent a request for authentication, the consumable product is secured to the device, another condition, or combinations thereof. The authentication session initiator (508) represents programmed instructions that, when executed, cause the processing resources (502) to initiate an authentication session between the device and the consumable product.

The digital signature verifier (512) represents programmed instructions that, when executed, cause the processing resources (502) to verify a digital signature stored in the memory of the consumable product with the key (510). The signed data confirmer (514) represents programmed instructions that, when executed, cause the processing resources (502) to confirm that the signed data appears to be genuine. If the signed data confirmer (514) cannot make such a confirmation, authentication is denied.

The identifier matcher (516) represents programmed instructions that, when executed, cause the processing resources (502) to match an identifier found in the signed data with the identifiers stored in the device's history. If the identifier matcher (516) cannot match the identifier with one from the device's history, the consumable product is authenticated. The remaining life value determiner (518) represents programmed instructions that, when executed, cause the processing resources (502) to determine the remaining life value of the consumable product. The remaining life value comparer (520) represents programmed instructions that, when executed, cause the processing resources (502) to compare the identifier's remaining life value with the remaining life value of the identifier stored in the printer history (522).

The authenticator (524) represents programmed instructions that, when executed, cause the processing resources (502) to authenticate the consumable product in response to determining that the recorded remaining life value of the previously used print cartridge is higher than the remaining life value of the consumable product that is seeking authentication. The authentication denier (526) represents programmed instructions that, when executed, cause the processing resources (502) to deny authentication if it is determined that the recorded remaining life value is lower than the remaining life value of the consumable product seeking authentication.

Further, the memory resources (504) may be part of an installation package. In response to installing the installation package, the programmed instructions of the memory resources (504) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (502) and the memory resources (504) are located within the same physical component, such as a server, or a network component. The memory resources (504) may be part of the physical component's main memory, caches, registers, non-volatile memory, or elsewhere in the physical component's memory hierarchy. Alternatively, the memory resources (504) may be in communication with the processing resources (502) over a network. Further, the data structures, such as the libraries may be accessed from a remote location over a network connection while the programmed instructions are located locally. Thus, the authentication system (500) may be implemented on a user device, on a server, on a collection of servers, or combinations thereof.

The authentication system (500) of FIG. 5 may be part of a general purpose computer. However, in alternative examples, the authentication system (500) is part of an application specific integrated circuit.

While the examples above have been described with reference to specific mechanisms for verifying a digital signature, any appropriate mechanism for verifying a digital signature may be used in accordance with the principles described herein. Further, while the examples above have been described with reference to specific mechanisms of determining an identifier of a consumable product, any appropriate mechanism for determining an identifier of a consumable product may be used in accordance with the principles described herein.

Also, while the examples above have been described with reference to specific mechanisms of matching the identifiers of the current consumable product with the records of the device's past usage or with the past usage of other devices, any appropriate mechanism for matching identifiers may be used in accordance with the principles described herein. Further, while the examples above have been described with reference to specific mechanisms for determining the remaining life value of the current consumable product and the previously used consumable products, any appropriate mechanism for determining any remaining life value may be used in accordance with the principles described herein.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method of a system comprising a processor, comprising:
    in response to insertion of a consumable product in a first device, establishing an authentication session with the consumable product through a communication pathway between the consumable product and the first device; and
    in the authentication session:
        determining that an identifier stored in a memory of the consumable product is in a first device history for the first device;
        determining whether a current remaining life value in the memory of the consumable product is greater than a recorded remaining life value in the first device history, the recorded remaining life value being for the consumable product and associated with the identifier of the consumable product in the first device history;
        determining whether a recorded remaining life value for the consumable product in a second device history for a second device different from the first device is less than the current remaining life value in the memory of the consumable product; and
    concluding that the consumable product is not authentic using the first and second device histories, the concluding being in response to:
        determining that the current remaining life value in the memory of the consumable product is greater than the recorded remaining life value for the consumable product in the first device history, or
        determining that the recorded remaining life value for the consumable product in the second device history is less than the current remaining life value in the memory of the consumable product.

2. The method of claim 1, wherein the current remaining life value in the memory of the consumable product includes a drum life factor.

3. The method of claim 1, wherein the current remaining life value in the memory of the consumable product includes a developer life factor.

4. The method of claim 1, wherein the first device history is stored locally in the first device.

5. The method of claim 1, wherein the first device history is stored on a remote memory accessible over a network.

6. The method of claim 1, wherein the identifier is included in a digital signature that is stored in the memory of the consumable product.

7. The method of claim 6, further comprising, in the authentication session, verifying the digital signature with a key.

8. The method of claim 1, further comprising recognizing that the consumable product is secured in the first device.

9. The method of claim 1, wherein the system that performs the method is the first device.

10. A system comprising:
    a processor; and
    a non-transitory storage medium storing instructions that are executable on the processor to:
        in response to insertion of a consumable product in a first device, establish an authentication session with the consumable product through a communication pathway between the consumable product and the first device; and
        in the authentication session:
            determine that an identifier stored in a memory of the consumable product is in a first device history of the first device;
            determine a current remaining life value of the consumable product;
            determine whether the current remaining life value in the memory of the consumable product is greater than a recorded remaining life value in the first device history, the recorded remaining life value being for the consumable product and associated with the identifier of the consumable product in the first device history;
            determine whether a recorded remaining life value for the consumable product in a second device history of a second device different from the first device is less than the current remaining life value in the memory of the consumable product; and indicate that the consumable product is not authentic using the first and second device histories, the indicating being in response to:
- determining that the current remaining life value in the memory of the consumable product is greater than the recorded remaining life value for the consumable product in the first device history, or
- determining that the recorded remaining life value for the consumable product in the second device history is less than the current remaining life value in the memory of the consumable product.

11. The system of claim 10, wherein the instructions are executable on the processor to, in the authentication session, verify a digital signature stored in the memory of the consumable product with a key that is stored locally on the first device.

12. The system of claim 10, wherein the consumable product is a print cartridge and the first device is a printer.

13. The system of claim 10, wherein the current remaining life value in the memory of the consumable product is based on a remaining life of a moving part of the consumable product.

14. The system of claim 10, wherein the processor and the non-transitory storage medium are part of the first device.

15. A non-transitory computer readable storage medium storing program instructions that, when executed, cause a processor to:
- in response to insertion of a consumable product in a first device, establish an authentication session with the consumable product through a communication pathway between the consumable product and the first device; and
- in the authentication session:
  - determine that an identifier stored in a memory of the consumable product is in a first history of the first device;
  - determine a current remaining life value of the consumable product;
  - determine whether the current remaining life value in the memory of the consumable product is greater than a recorded remaining life value in the first history, the recorded remaining life value being for the consumable product and associated with the identifier of the consumable product in the first history;
  - determine whether a recorded remaining life value for the consumable product in a second history for a second device different from the first device is less than the current remaining life value in the memory of the consumable product; and
  - indicate that the consumable product is not authentic using the first and second histories, the indicating being in response to:
    - determining that the current remaining life value in the memory of the consumable product is greater than the recorded remaining life value for the consumable product in the first history, or
    - determining that the recorded remaining life value for the consumable product in the second history is less than the current remaining life value in the memory of the consumable product.

16. The method of claim 1, wherein the current remaining life value in the memory of the consumable product is based on a number of refills of the consumable product.

17. The method of claim 1, wherein the current remaining life value in the memory of the consumable product is based on a remaining life of a moving part of the consumable product.

18. The non-transitory computer readable storage medium of claim 15, wherein the processor on which the program instructions are executable is part of the first device.

* * * * *

UNITED STATES PATENT AND TRADEMARK OFFICE
CERTIFICATE OF CORRECTION

PATENT NO. : 10,205,596 B2  
APPLICATION NO. : 14/908692  
DATED : February 12, 2019  
INVENTOR(S) : Paul L. Jeran et al.

Page 1 of 1

It is certified that error appears in the above-identified patent and that said Letters Patent is hereby corrected as shown below:

On the Title Page

In item (73), Assignee, in Column 1, Line 1, delete "Hewlett-Pachard" and insert -- Hewlett-Packard --, therefor.

Signed and Sealed this  
Twenty-sixth Day of November, 2019

Andrei Iancu  
*Director of the United States Patent and Trademark Office*